United States Patent [19]
Lewis

[11] Patent Number: 6,107,434
[45] Date of Patent: Aug. 22, 2000

[54] HEAT CURABLE ORGANOPOLYSILOXANE COMPOSITIONS

[75] Inventor: Larry Neil Lewis, Scotia, N.Y.

[73] Assignee: General Electric Company, Schenectady, N.Y.

[21] Appl. No.: 09/134,763

[22] Filed: Aug. 14, 1998

[51] Int. Cl.[7] .................................................... C08G 77/08
[52] U.S. Cl. ................................................ 528/15; 528/12
[58] Field of Search ......................................... 528/12, 15

[56] References Cited

U.S. PATENT DOCUMENTS

| | | | |
|---|---|---|---|
| 3,383,356 | 5/1968 | Nielsen et al. | 528/15 |
| 3,445,420 | 5/1969 | Kookootsedes et al. | |
| 4,504,645 | 3/1985 | Melancon . | |
| 4,595,739 | 6/1986 | Cavezzan . | |
| 4,689,384 | 8/1987 | Kondow et al. | |
| 5,015,691 | 5/1991 | Lewis et al. | |
| 5,331,075 | 7/1994 | Lewis et al. | |

FOREIGN PATENT DOCUMENTS 0051384  5/1982  European Pat. Off. .

*Primary Examiner*—Robert Dawson
*Assistant Examiner*—Jeffrey B. Robertson
*Attorney, Agent, or Firm*—Bernadette M. Bennett; Donald S. Ingraham

[57] ABSTRACT

Heat curable platinum catalyzed organopolysiloxane compositions are provided, such as paper release formulations, which have enhanced shelf-life based on the employment of certain inhibitors, in the form of a halogenated organic compound having at least one unsaturated group, such as an olefinic or alkynyl group.

6 Claims, No Drawings

HEAT CURABLE ORGANOPOLYSILOXANE COMPOSITIONS

BACKGROUND OF THE INVENTION

1. Field of the Invention

The present invention relates to a Platinum Group Metal (PGM) catalyzed addition-curable organopolysiloxane compositions having an extended shelf and work life. More particularly, the present invention is directed to the employment of a PGM catalyst inhibitor in a heat curable organopolysiloxane composition, where the PGM catalyst inhibitor is a halogenated organic compound having at least one olefinic or acetylenic group.

2. Discussion of the Prior Art

As shown by C. A. Sumpter et al, U.S. Pat. No. 5,331,075, addition curable organopolysiloxane compositions are well known in the art. A typical addition curable organopolysiloxane composition involves an addition reaction in the presence of an effective amount of a PGM catalyst, such as a platinum or rhodium catalyst, between a "vinylpolysiloxane" and a multi-hydrogen functional silicon-hydride material, such as a "silicon hydride siloxane". The vinylpolysiloxane can be an organopolysiloxane having alkenyl radicals, for example, vinyl radicals attached to silicon by carbon-silicon bonds. Usually, the PGM catalyst is employed as a mixture with the vinyl polysiloxane prior to contact with the multi-hydrogen functional silicon-hydride material. Upon mixing the various ingredients, crosslinking or cure, often occurs within seconds at ambient temperatures.

In order to increase work time, the "two part mixture" approach is sometimes used. The first part, or "part one" can be a mixture of an effective amount of the PGM catalyst, and the vinyl organopolysiloxane; "part two" can be a mixture of the silicon hydride siloxane and the balance of the vinyl organopolysiloxane.

While the two part mixture is often used, the preferred procedure is to provide a "one part mixture" of all of the ingredients. Even though all the ingredients are mixed together, the one part mixture can have an extended shelf life at ambient temperatures. In addition, the one part mixture preferably can exhibit a rapid cure, such as within 10–30 minutes, when heated at temperatures in the range of about 120° C. to about 150° C.

Various procedures have been developed in the art to achieve effective results with one part mixtures. While two part mixtures have the advantage of an indefinite shelf-life over a wide temperature range, in order to achieve the desired advantages in the one part mixture, the PGM catalyst must be rendered inactive, or "masked" at ambient temperatures. However, the PGM catalyst can be reactivated at the command of the end user at an appropriate higher temperature.

Several procedures have been developed for masking the activity of the PGM catalyst at ambient temperatures. For example, a latent platinum catalyst is shown as a preform with an organic-nitrogen compound in U.S. Pat. No. 5,331,075; an encapsulated form of platinum catalyst, is taught in U.S. Pat. No. 5,015,691. In addition, certain unsaturated materials, such as a maleate, or acetylenic alcohol have been found to function as inhibitors when added directly to a PGM catalyzed hydrosilylation mixture. However, the weight level required to achieve effective inhibition results with such added unsaturated materials can lead to environmental release problems, based on the excessive quantities required. It would be desirible therefor to identify effective PGM inhibitors which could be added directly to to PGM catalyzed hydrosilylation mixtures to provide useful one part heat curable mixtures.

SUMMARY OF THE INVENTION

The present invention is based on the discovery that certain organic compounds, which bear a halogen group, such as chloro, or bromo, as well as possess aliphatic unsaturation, for example olefinic, or acetylenic unsaturation, and referred to hereinafter as "haloaliphatic compounds" have been found to be highly effective as direct addition hydrosilylation inhibitors for one part mixtures. While maleates, fumarates and acetylenic alcohols are presently recognized as choice one part PGM catalyst inhibitors, in many instances, the ratio of moles of inhibitor to moles of platinum, such as 35:1, are often required to inhibit cure at ambient conditions. As a result of such high levels needed for ambient cure inhibition, excessively higher temperatures requirements can result to effect cure at elevated temperatures within a reasonable time.

Differential scanning calorimetry (DSC) results have now shown that in certain one part paper release formulations having a 1–2 day shelf stability, haloaliphatic compounds, such as 1-bromo-2-butyne, or crotyl bromide, can be highly effective at levels of 5:1 moles of inhibitor per mole of platinum. This data is significant when compared to inhibitors, such as dimethyl maleate of the prior art, which requires a ratio of 35:1 moles of inhibitor per mole of platinum.

STATEMENT OF THE INVENTION

There is provided by the present invention, a one part heat curable organopolysiloxane composition having at least 24 hours of shelf stability at ambient conditions, comprising a vinyl substituted organopolysiloxane fluid, a multi-hydrogen functional silicon-hydride material, an effective amount of a PGM catalyst, and an effective amount of a halogenated organic compound having at least one chemically combined olefinic or acetylenic group, which halogenated organic compound is present in the one part heat curable organopolysiloxane composition in an amount sufficient to provide a ratio of moles of halogenated organic compound, per atom of PGM metal, having a value of about 2 to about 10.

DETAILED DESCRIPTION OF THE INVENTION

Among the halogen bearing aliphatically unsaturated organic compounds which can be used as PGM catalyst inhibitors in accordance with the practice of the invention, there are preferably included organic compounds having olefinic, or acetylenic unsaturation and a molecular weight within the range of about 120 to about 250. In addition, halogen bearing aliphatically unsaturated organic compounds are also included as shown by the following formula:

where Q is a monovalent, or polyvalent $C_{(3-12)}$ organic group, X is a halogen radical, or a halogen substituted $C_{(2-8)}$ aliphatically unsaturated organic radical, and "a" is a whole number equal to 0 or 1; and when X is a halogen radical, "a"

is 1; and when X is a halogen substituted $C_{(2-8)}$ aliphatically unsaturated organic radical, "a" can be 0.

Radicals included within Q are for example, a monovalent aromatic group, such as phenyl, which can be substituted with at least one $C_{(2-8)}$ aliphatically unsaturated organic radical, or substituted with monovalent radicals such as halogen radicals, $C_{(1-8)}$ alkyl radicals, and functional groups such as carboxy radicals, and cyanoalkyl radicals.

Some of the preferred halogen bearing aliphatically unsaturated organic compounds of which can be employed in the present invention, are compounds such as crotyl bromide, crotyl chloride, 1-bromo-2-butyne, and 1-bromo-2-pentyne.

Various Platinum Group Metal (PGM) catalysts can be used in the one part heat curable organopolysiloxane compositions of the present invention and include complexes of platinum, rhodium, ruthenium, and palladium. Preferably, platinum halide complexes are used and include vinylsiloxane-chloroplatinic acid complexes shown in Karstedt, U.S. Pat. No. 3,715,334 which is incorporated herein by reference.

The vinylorganopolysiloxane fluid, or "vinyl siloxane" which can be used in the one part heat curable organopolysiloxane compositions of the present invention can have a viscosity of from about 100 to about 200,000 centipoise and a vinylsiloxy unit content of about 0.05 to about 3.5 mole %, and preferably 0.14 to about 2 mole % based on the total siloxy units having one or more organo radicals as defined hereinafter attached to silicon. The preferred vinyl siloxanes are included within the following formula,

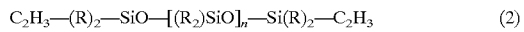

$$C_2H_3-(R)_2-SiO-[(R_2)SiO]_n-Si(R)_2-C_2H_3 \quad (2)$$

where $C_2H_3$ is vinyl, and R is selected from $C_{(1-13)}$ monovalent hydrocarbon radicals free of olefinic unsaturation, and "n" is a positive integer having a value sufficient to provide a vinyl siloxane viscosity of from about 100 to about 200,000 centipoise at 25° C. Preferably, R is selected from $C_{(1-8)}$ alkyl radicals, such as methyl, ethyl, propyl; mononuclear aryl radicals, such as phenyl and alkylphenyl; cycloalkyl radical and haloalkyl radicals such as 3,3,3,-trifluoropropyl. Preferably, the vinyl siloxane has terminal units of the formula, $$C_2H_3(CH_3)_2SiO_{0.5} \quad (3)$$

Methods for preparing the vinylsiloxanes of formula (2) are well known as shown in Sumpter et al U.S. Pat. No. 5,331,075, which is incorporated herein by reference.

The multi-hydrogen functional silicon-hydride material, or silicon hydride siloxane fluid can have about 0.04 to about 1.4% by weight of chemically combined hydrogen attached to silicon. One form of the silicon hydride siloxane is polydiorganosiloxane having a viscosity of from about 1 to about 500 centipoise at 25° C., and from about 3 to 9 mole percent of chain-stopping units based on the total moles of chemically combined siloxy units, which silicon hydride siloxane has terminal diorganohydrosiloxy units, where the organo radicals are selected from $C_{(1-13)}$ monovalent hydrocarbon radicals free of olefinic unsaturation.

The silicon hydride siloxane also can include silicon hydride resins having terminal diorganohydrosiloxy units chemically combined with $SiO_2$ units, where the ratio of the sum of organo radicals+hydrogen radicals to Si can vary from about 1.0 to 2.7. Additional silicon hydride siloxane and methods for making also can be found in Sumpter et al U.S. Pat. No. 5,331,075, which is incorporated herein by reference.

There also may be incorporated in the one part heat curable organopolysiloxane compositions of the present invention, from about 5 to about 100 parts by weight of a filler based on 100 parts by weight of the vinyl substituted organopolysiloxane fluid, or vinylsiloxane fluid. The filler can be selected from fumed silica, precipitated silica, and mixtures thereof. Preferably, less than 50 parts by weight of filler, per 100 parts of of the vinylsiloxane fluid is used. In place of the reinforcing filler, such as fumed silica, and precipitated silica, there may be used extending fillers in amounts which do not unduly increase the viscosity of the composition in the uncured state. Several examples of extending fillers are shown in Sumpter et al U.S. Pat. No. 5,331,075.

For liquid injection molding applications, it has been found desirable to limit the viscosity of the curable mixture below 500,000 centipoise at 25° C., and preferably below 200,000 centipoise at 25° C.

Cure of the heat curable composition of the present invention can be achieved at 20° C. to 200° C., and preferably 50° C. to 150° C.

An effective amount of the PGM catalyst is an amount which is sufficient to provide from about 5 ppm to 300 ppm of PGM catalyst, and preferably 5 ppm to 50 ppm.

In order that those skilled in the art will be better able to practice the present invention, the following examples are given by way of illustration, and not by way of limitation. All parts are by weight unless indicated otherwise.

EXAMPLE 1

A paper release base mixture was prepared using 10 parts of a vinylsiloxane fluid having 0.62% by weight vinyl, and 0.5 part of a silicon hydride siloxane having 1.05% by weight hydrogen. The vinylsiloxane fluid was in the form of a vinyldimethylsiloxy terminated poldimethylsiloxane having a viscosity of about 400 centipoise; the silicon hydride siloxane was a trimethylsiloxy terminated copolymer of methylhydrogen siloxy units and dimethylsiloxy units.

A series of mixtures were prepared consisting of respective portions of the above base formulation with a particular inhibitor, prior to the addition of platinum catalyst. The platinum free mixtures are identified by the particular inhibitor, and the proportions used as follows:

| Inhibitor (mmol) | Base mixture (µL) |
| --- | --- |
| A. dimethylmaleate (29) | 36.5 |
| B. 1-bromo-2-butyne (4) | 3.5 |
| C. crotyl bromide (4) | 4.1 |

There was then added to the respective mixtures, a predetermined amount of platinum catalyst to provide 150 ppm, or 8 µmol of Pt. The platinum catalyst used is shown by Karstedt U.S. Pat. No. 3,715,334. As a result, the ratio of inhibitor to platinum in mixture A (dimethylmaleate) was 36:1; the ratio of inhibitor to platinum in mixture B (1-bromo-2-butyne) was 5:1; the ratio of inhibitor to platinum in mixture C (crotyl bromide) was 5:1. The resulting platinum containing paper release formulations are designated hereinafter as A, B, and C which respectively correspond to the platinum free mixtures A, B, and C above.

Paper release formulations A and C were coated on super calendered kraft paper with a straight edge "doctor blade" and then cured 15 seconds in an air circulating oven at 113° C. for 15 seconds. Both formulations provided satisfactory coatings.

DSC analyses of the above paper release formulations are shown as follows:

| Formulations | Onset Temperature (° C.) | Exotherm Peak (° C.) |
|---|---|---|
| A | 67 | 91 |
| B | 101 | 111 |
| C | 92 | 107 |

After 2 days at ambient temperatures, formulation A, having the dimethylmaleate inhibitor, gelled, while B and C remained substantially unchanged.

EXAMPLE 2

A series of heat curable coating formulations were prepared using the respective inhibitors of the A, B and C formulations of Example 1. A masterbatch was prepared consisting in part of 200 parts of a polydimethysiloxane having terminal vinyidimethylsiloxy units, and 50 parts of a [bis (trimethylsiloxy), bis (dimethylvinylsiloxy)] tetrasiloxane.

An A formulation was prepared consisting of 10 parts of the above masterbatch, 2 µL of a 5% by weight platinum solution in xylene (0.44 umol Pt), 27 µL (117 mmol) of dibutylmaleate, and 0.7 of part of a siloxane hydride having 0.8% H in the form of a trimethylsiloxy terminated copolymer of methylhydrogensiloxane and dimethylsiloxane. Based on mixture proportions, there was a ratio of 266:1 moles of dibutylmaleate to platinum.

A B formulation was prepared following the above procedure using 1-bromo-2-butyne as the inhibitor. Except for the 1.5 mL (16 mmol) usage of inhibitor, all proportions were doubled. The final mixture had an inhibitor to platinum ratio of 20:1.

Following the B formulation procedure, there was used 1.7 µL (15.4 mmol) of crotyl bromide to prepare the C formulation having an inhibitor to platinum ratio of 35:1.

Samples of the A, B, and C formulations were heated for several days at 50° C. After two days the respective samples did not gell. After 5 days, sample A containing the dibutylmaleate inhibitor gelled and sample B containing the 1-bromo-2-butyne inhibitor, partly gelled.

A DSC analysis of the respective coating formulations was done to determine the effectiveness of the inhibitors in PGM catalyzed coating formulations. The following results were obtained:

| Formulation | Onset Temp (° C.) | Exotherm Peak (° C.) |
|---|---|---|
| A | 91 | 117 |
| B | 112 | 127 |
| C | 106 | 130 |

The above results show that even at a reduced ratios of inhibitor to PGM metal usage, a substantially equivalent, or even a superior inhibiting performance can be achieved with the halogenated organic compounds having at least one olefinic or acetylenic group as provided by the present invention as compared to the inhibitors of the prior art.

What is claimed is:

1. A one part heat curable organopolysiloxane composition having at least 24 hours of shelf stability at ambient conditions, comprising a vinyl substituted organopolysiloxane fluid, a multi-hydrogen functional silicon-hydride material, an effective amount of a PGM catalyst, and an effective amount of a halogenated organic compound wherein the halogenated compound comprises 1-bromo-2-butyne or crotyl bromide, which halogenated organic compound is present in the one part heat curable organopolysiloxane composition at an amount sufficient to provide a ratio of moles of halogenated organic compound, per atom of PGM metal, having a value of about 2 to about 10.

2. A one part heat curable organopolysiloxane composition in accordance with claim 1, where the PGM catalyst is a platinum complex.

3. A one part heat curable organopolysiloxane composition in accordance with claim 1, where the vinyl substituted organopolysiloxane fluid is a vinyl substituted polydimethylsiloxane fluid.

4. A heat curable paper release formulation comprising a vinyl containing methylsiloxane fluid, a silicone hydride siloxane, an effective amount of a PGM catalyst wherein the PGM catalyst comprises a platinum complex, and an effective amount of a halogenated organic compound wherein the halogenated organic compound comprises 1-bromo-2-butyne or crotyl bromide.

5. A one part heat curable organopolysiloxane composition having at least 24 hours of shelf stability at ambient conditions, comprising vinyl substituted polydimethylsiloxane fluid, a multi-hydrogen functional silicon-hydride material, an effective amount of a platinum complex, and an effective amount of 1-bromo-2-butyne.

6. A heat curable paper release formulation comprising a vinyl containing methylsiloxane fluid, a silicon hydride siloxane, an effective amount of a platinum complex, and an effective amount of 1-bromo-2-butyne.

* * * * *